United States Patent
Bohannon et al.

(10) Patent No.: US 10,635,236 B2
(45) Date of Patent: Apr. 28, 2020

(54) CALIBRATION OF MULTIPLE ANALOG FRONT-ENDS

(71) Applicant: SYNAPTICS INCORPORATED, San Jose, CA (US)

(72) Inventors: Eric Scott Bohannon, Henrietta, NY (US); Steve Chikin Lo, Sunnyvale, CA (US); Keung Kwok Kwan, Fremont, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 133 days.

(21) Appl. No.: 15/660,393

(22) Filed: Jul. 26, 2017

(65) Prior Publication Data
US 2019/0034027 A1 Jan. 31, 2019

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01); *G06F 2203/04101* (2013.01); *G06F 2203/04107* (2013.01)

(58) Field of Classification Search
CPC ...... G06F 3/038; G06F 3/0383; G06F 3/0416; G06F 3/044; G06F 3/03545; G06F 2203/04104; G06F 2203/04107; G06F 3/0418; G06F 2203/04105
See application file for complete search history.

(56) References Cited

U.S. PATENT DOCUMENTS

| | | | | |
|---|---|---|---|---|
| 9,264,059 B2* | 2/2016 | Tousi | ................ | H03M 1/1038 |
| 9,348,451 B2* | 5/2016 | Wilson | ................ | G06F 3/0418 |
| 9,484,859 B2* | 11/2016 | Huang | ................ | H03B 5/1265 |
| 9,880,664 B2* | 1/2018 | Agarwal | ............... | G06F 3/0418 |
| 10,175,839 B2* | 1/2019 | Srivastava | ............ | G06F 3/0412 |
| 2007/0074913 A1* | 4/2007 | Geaghan | ................ | G06F 3/044 178/18.06 |
| 2010/0060589 A1* | 3/2010 | Wilson | ................ | G06F 3/0412 345/173 |
| 2013/0176269 A1* | 7/2013 | Sobel | ...................... | G06F 3/044 345/174 |
| 2014/0145997 A1* | 5/2014 | Tiruvuru | ................ | G06F 3/044 345/174 |

(Continued)

*Primary Examiner* — Bryan Earles
(74) *Attorney, Agent, or Firm* — Patterson + Sheridan, LLP

(57) ABSTRACT

Methods and associated processing systems are disclosed for acquiring gain mismatch values and offset mismatch values corresponding to a plurality of analog-to-digital converters (ADCs). One method comprises coupling receiver circuitry of a processing system with a capacitive sensor comprising a plurality of sensor electrodes, the receiver circuitry comprising a plurality of ADCs, each ADC of the plurality of ADCs coupled with one or more respective sensor electrodes of the plurality of sensor electrodes. The method further comprises, while at least a portion of transmitter circuitry of the processing system is disabled, acquiring measurements using each ADC of the plurality of ADCs; and storing, using the acquired measurements, a plurality of offset mismatch values in a memory of the processing system. The processing system is operable to apply the plurality of offset mismatch values to capacitive measurements acquired using the plurality of ADCs.

20 Claims, 7 Drawing Sheets

(56) References Cited

U.S. PATENT DOCUMENTS

| | | | |
|---|---|---|---|
| 2015/0130733 A1* | 5/2015 | Chang | G06F 3/03545 345/173 |
| 2015/0261340 A1* | 9/2015 | Krah | G06F 3/044 345/174 |
| 2016/0195990 A1* | 7/2016 | Han | G06F 1/3262 345/173 |
| 2016/0211857 A1* | 7/2016 | Barrenscheen | H03M 1/129 |
| 2017/0010717 A1* | 1/2017 | Kim | G06F 3/0418 |
| 2017/0090619 A1* | 3/2017 | Yousefpor | G06F 3/044 |
| 2017/0212635 A1* | 7/2017 | Cordeiro | G06F 3/0416 |

* cited by examiner

|  | $C_{CAL}(1)$ | $C_{CAL}(2)$ | Difference value | Normalized |
| --- | --- | --- | --- | --- |
| Actual value (pf) | 1.00 | 2.00 |  |  |
| AFE1 value | 1.02 | 2.05 | 1.03 | 1.01 |
| AFE2 value | 0.95 | 1.91 | 0.96 | 0.94 |
| ... | ... | ... | ... | ... |
| AFE$n$ value | 1.05 | 2.09 | 1.04 | 1.02 |
| Average difference value | | | 1.02 | |

FIG. 9

CALIBRATION OF MULTIPLE ANALOG FRONT-ENDS

BACKGROUND

Field

Embodiments disclosed herein generally relate to electronic devices, and more specifically, techniques for performing calibration of multiple analog front-ends of a processing system.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is a method comprising coupling receiver circuitry of a processing system with a capacitive sensor comprising a plurality of sensor electrodes. The receiver circuitry comprises a plurality of analog-to-digital converters (ADCs), and each ADC of the plurality of ADCs is coupled with one or more respective sensor electrodes of the plurality of sensor electrodes. The method further comprises, while at least a portion of transmitter circuitry of the processing system is disabled, acquiring measurements using each ADC of the plurality of ADCs; and storing, using the acquired measurements, a plurality of offset mismatch values in a memory of the processing system. The processing system is operable to apply the plurality of offset mismatch values to capacitive measurements acquired using the plurality of ADCs.

Another embodiment described herein is a processing system comprising transmitter circuitry configured to drive sensing signals onto a plurality of sensor electrodes, and receiver circuitry comprising a plurality of analog-to-digital converters (ADCs). Each ADC of the plurality of ADCs is coupled with one or more respective sensor electrodes of the plurality of sensor electrodes. The receiver circuitry is configured to: while at least a portion of the transmitter circuitry is disabled, acquire measurements using each ADC of the plurality of ADCs; store, using the acquired measurements, a plurality of offset mismatch values in a memory; and apply the plurality of offset mismatch values to capacitive measurements acquired using the plurality of ADCs.

Another embodiment described herein is a method comprising coupling receiver circuitry of a processing system with a capacitive sensor comprising a plurality of sensor electrodes. The receiver circuitry comprises a plurality of analog-to-digital converters (ADCs), wherein each ADC of the plurality of ADCs is coupled with one or more respective sensor electrodes of the plurality of sensor electrodes. The method further comprises coupling, while a calibration capacitor is set to a first non-zero capacitance value, each ADC of the plurality of ADCs to the calibration capacitor to acquire a plurality of first measurements. The method further comprises coupling, while the calibration capacitor is set to a second non-zero capacitance value, each ADC of the plurality of ADCs to the calibration capacitor to acquire a plurality of second measurements. The method further comprises determining, using the first measurements and the second measurements, a plurality of gain mismatch values corresponding to the plurality of ADCs, wherein the processing system is operable to apply the plurality of gain mismatch values to capacitive measurements acquired using the plurality of ADCs.

Another embodiment described herein is a processing system comprising transmitter circuitry configured to drive sensing signals onto a plurality of sensor electrodes, and receiver circuitry comprising a plurality of analog-to-digital converters (ADCs). Each ADC of the plurality of ADCs is coupled with one or more respective sensor electrodes of the plurality of sensor electrodes. The receiver circuitry is configured to couple, while a calibration capacitor is set to a first non-zero capacitance value, each ADC of the plurality of ADCs to the calibration capacitor to acquire a plurality of first measurements. The receiver circuitry is further configured to couple, while the calibration capacitor is set to a second non-zero capacitance value, each ADC of the plurality of ADCs to the calibration capacitor to acquire a plurality of second measurements. The receiver circuitry is further configured to determine, using the first measurements and the second measurements, a plurality of gain mismatch values corresponding to the plurality of ADCs. The receiver circuitry is further configured to apply the plurality of gain mismatch values to capacitive measurements acquired using the plurality of ADCs.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 9 is a chart illustrating exemplary compensation for gain mismatch values, according to embodiments described herein.

Figure 1:
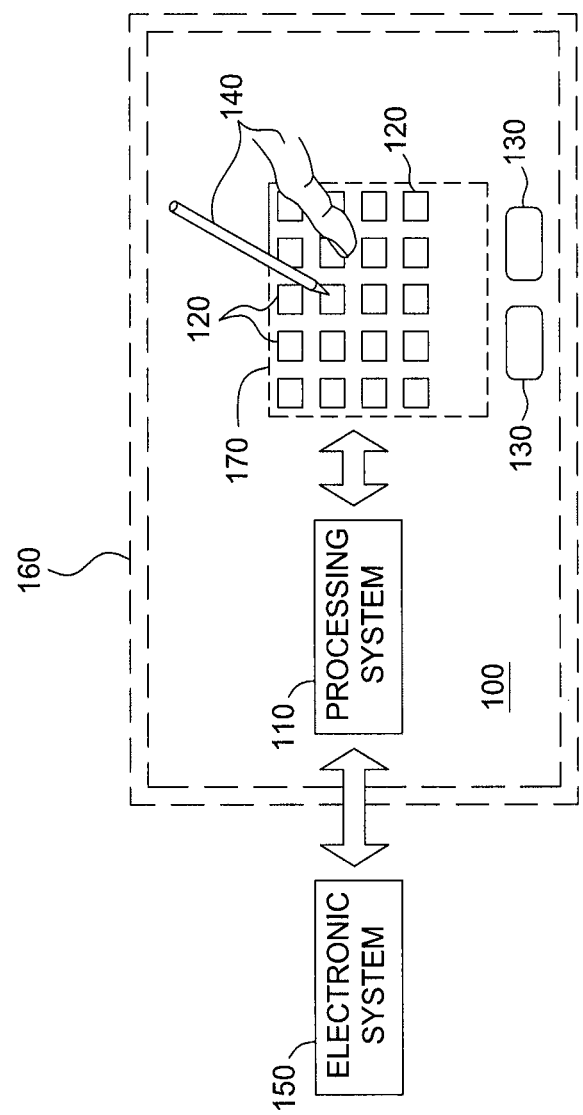
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present disclosure provide input devices and methods for improving usability. An input device may include electrodes that are operated as sensor electrodes to detect interaction between the input device and an input object (e.g., a stylus or a user's finger). The input device generally drives sensing signals onto the sensor electrodes to acquire capacitive measurements and/or force measurements corresponding to a sensing region.

Receiver circuitry of an input device may include a plurality of analog front-ends (AFEs) for acquiring capacitive measurements. However, each AFE may have different values of a gain parameter and/or an offset parameter, which can affect the capacitive measurements that are acquired by the different AFEs. For example, the capacitive measurements acquired by different AFEs may exhibit inaccuracy and/or non-uniformity due to the different values. Embodiments disclosed herein described techniques for compensating for gain mismatch and/or offset mismatch, which tend to improve the accuracy and/or uniformity of acquired capacitive measurements.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Example communication protocols include Inter-Integrated Circuit ($I^2C$), Serial Peripheral Interface (SPI), Personal System/2 (PS/2), Universal Serial Bus (USB), Bluetooth®, Radio Frequency (RF), and Infrared Data Association (IrDA) communication protocols.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, in some embodiments, sensing input may comprise no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be electrically modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a mobile device such as a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Implementations

Figure 2:
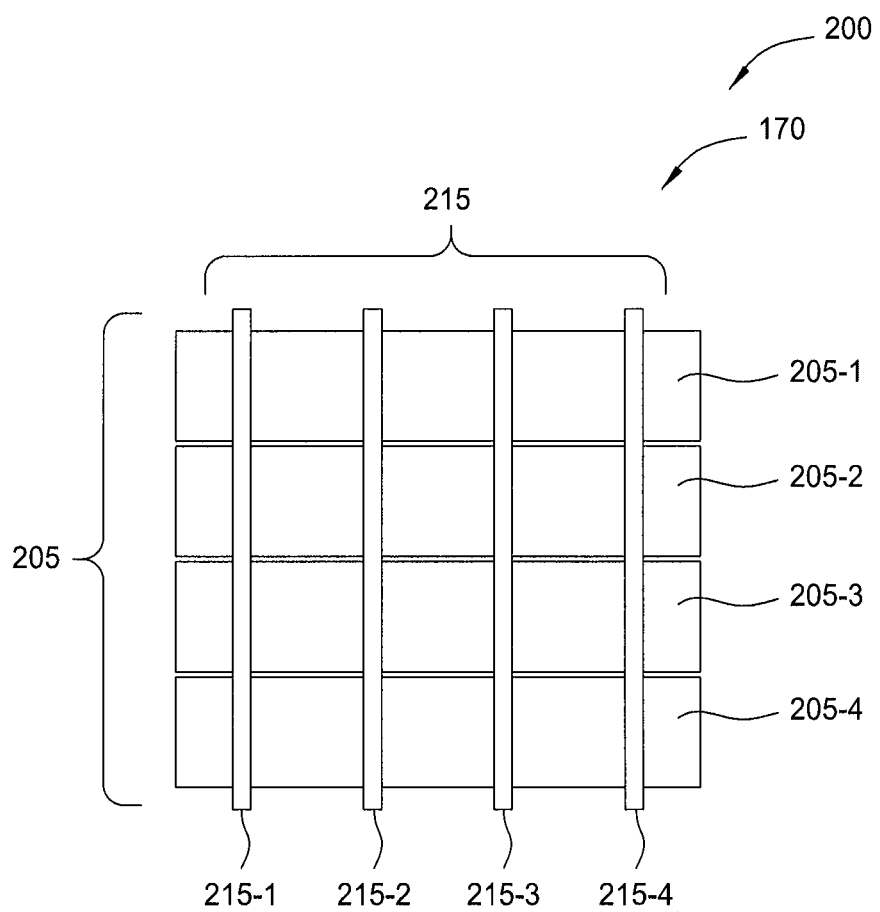
FIGS. 2 and 3 illustrate portions of exemplary sensor electrode implementations, according to embodiments described herein.
Figure 3:
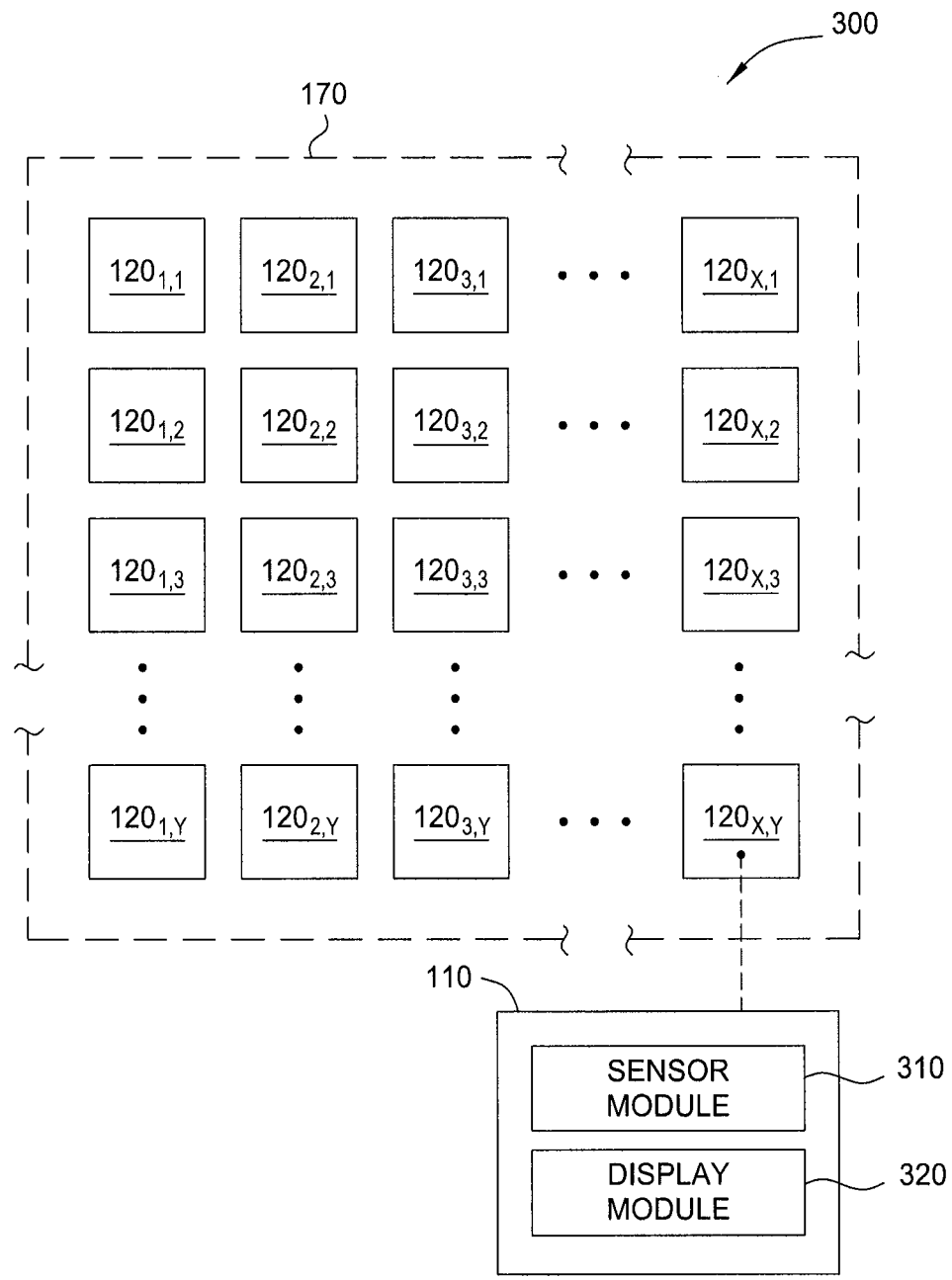

FIGS. 2 and 3 illustrate portions of exemplary sensor electrode arrangements, according to embodiments described herein. Specifically, arrangement 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other implementations of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable implementation. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, ..., $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, ..., $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or more sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensor module 310 and optionally, a display module 320. The sensor module 310 includes circuitry configured to drive at least one of the sensor electrodes 120 for capacitive sensing during periods in which input sensing is desired. In one embodiment, the sensor module 310 is configured to drive a modulated signal onto the at least one sensor electrode 120 to detect changes in absolute capacitance between the at least one sensor electrode and an input object. In another embodiment, the sensor module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 310 may be selectively coupled one or more of the sensor electrodes 120 and/or the grid electrode(s). For example, the sensor module 310 may be coupled to selected portions of the sensor electrodes 120 and operate in either an absolute or transcapacitive sensing mode. In another example, the sensor module 310 may be a different portion of the sensor electrodes 120 and operate in either an absolute or transcapacitive sensing mode. In yet another example, the sensor module 310 may be coupled to all the sensor electrodes 120 and operate in either an absolute or transcapacitive sensing mode.

The sensor module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 310 and display module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 310 includes circuitry configured to receive resulting signals with the sensor electrodes 120 and/or grid electrode(s) comprising effects corresponding to the modulated signals or the transmitter signals during periods in which input sensing is desired. The sensor module 310 may determine a position of the input object in the sensing region 170 or may provide a signal including information indicative of the resulting signal to another module or processor, for example, a determination module or a processor of an associated electronic device 150 (i.e., a host processor), for determining the position of the input object in the sensing region 170.

The display module 320 may be included in or separate from the processing system 110. The display module 320 includes circuitry configured to provide display image update information to the display of the display device 160 during non-sensing (e.g., display updating) periods.

In one embodiment, the processing system 110 comprises a first integrated controller comprising the display module 320 and at least a portion of the sensor module 310 (i.e., transmitter module and/or receiver module). In another embodiment, the processing system 110 comprises a first integrated controller comprising the display module 320 and a second integrated controller comprising the sensor module 310. In yet another embodiment, the processing system comprises a first integrated controller comprising display module 320 and a first portion of the sensor module 310 (e.g., one of a transmitter module and a receiver module) and a second integrated controller comprising a second portion of the sensor module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Exemplary Techniques for Calibration of Multiple Analog Front-Ends

Figure 4:
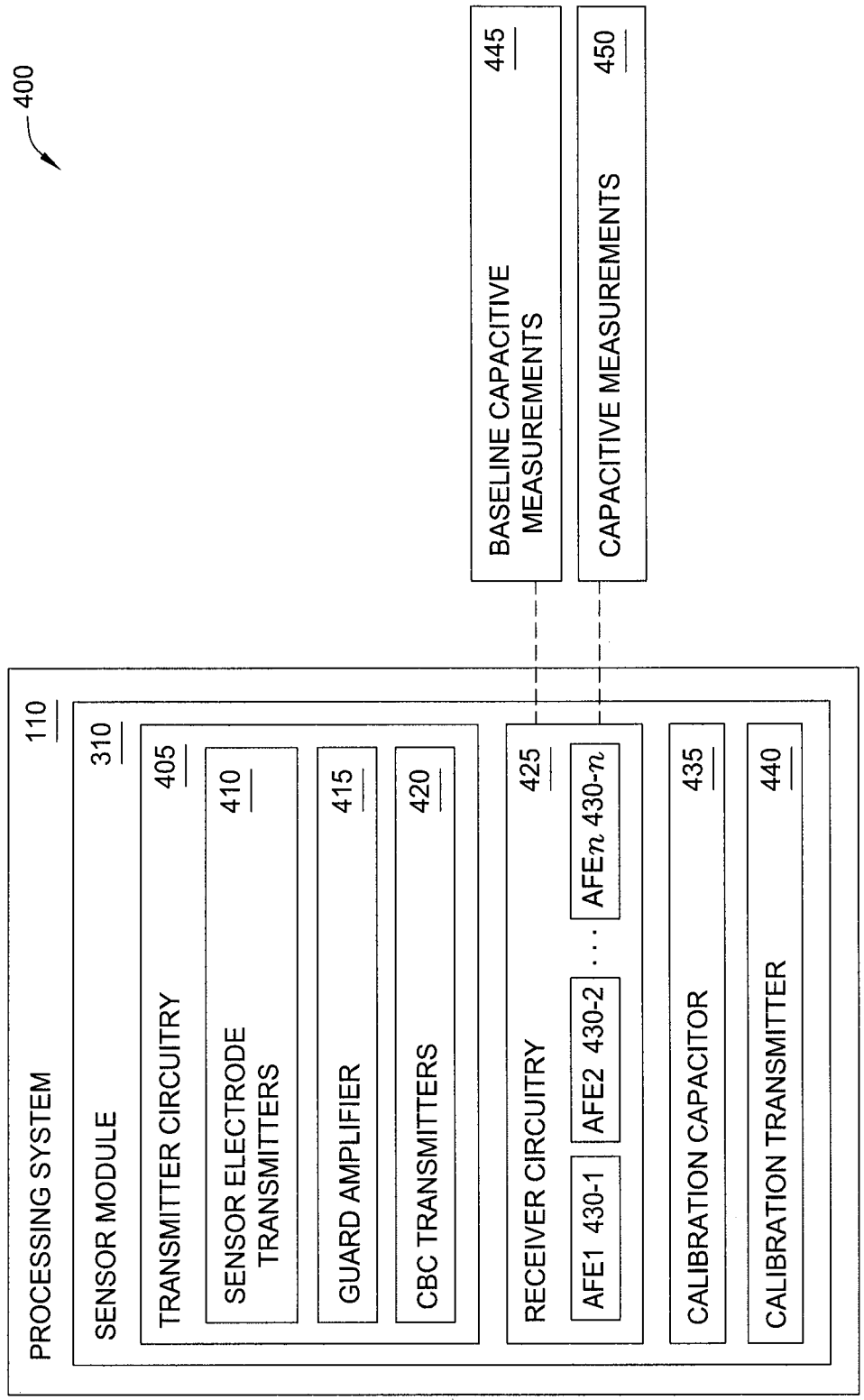
FIG. 4 is a diagram illustrating an exemplary processing system having multiple analog front-ends, according to embodiments described herein.

FIG. 4 is a diagram 400 illustrating an exemplary processing system having multiple analog front-ends, according to embodiments described herein. The processing system 110 may be used in conjunction with other embodiments, such as the arrangements 200, 300 of sensor electrodes illustrated in FIGS. 2, 3 and discussed above.

In the diagram 400, the sensor module 310 comprises transmitter circuitry 405 and receiver circuitry 425. Although the transmitter circuitry 405 and the receiver circuitry 425 are depicted as separate components, in other embodiments the transmitter circuitry 405 and the receiver circuitry 425 may have shared circuitry.

In some embodiments, the transmitter circuitry 405 comprises one or more sensor electrode transmitters 410 that are configured to drive sensing signals onto one or more coupled sensor electrodes for capacitive sensing, force sensing, etc. In some embodiments, the transmitter circuitry 405 comprises one or more guard amplifiers 415 that are configured to drive guarding signals onto the one or more coupled sensor electrodes. In some embodiments, the transmitter circuitry 405 comprises one or more coarse background compensation (CBC) transmitters 420 that are configured to mitigate a background capacitance of the sensor electrodes. Any suitable combination of components of the transmitter circuitry 405 is contemplated. Further, any other components that are configured to drive signals onto the one or more sensor electrodes to provide functionality to the sensor module 310 may be included in the transmitter circuitry 405.

In some embodiments, the receiver circuitry 425 comprises a plurality of analog front-ends (AFEs) 430-1, 430-2, . . . , 430-n (generically referred to as an AFE 430) that are each configured to acquire capacitive measurements, force measurements, etc. using the one or more coupled sensor electrodes.

As shown, the receiver circuitry 425 is configured to acquire a plurality of baseline capacitive measurements 445 and/or a plurality of capacitive measurements 450 using the plurality of AFEs 430. In some embodiments, the plurality of baseline capacitive measurements 445 are acquired for each AFE 430 and/or particular combinations of AFEs 430 and sensor electrodes. Consistent with the discussion above, the plurality of baseline capacitive measurements 445 may in turn be used when acquiring the plurality of capacitive measurements 450. Other measurements may also be acquired using the plurality of AFEs 430 and the plurality of sensor electrodes, such as force measurements.

Figure 5:
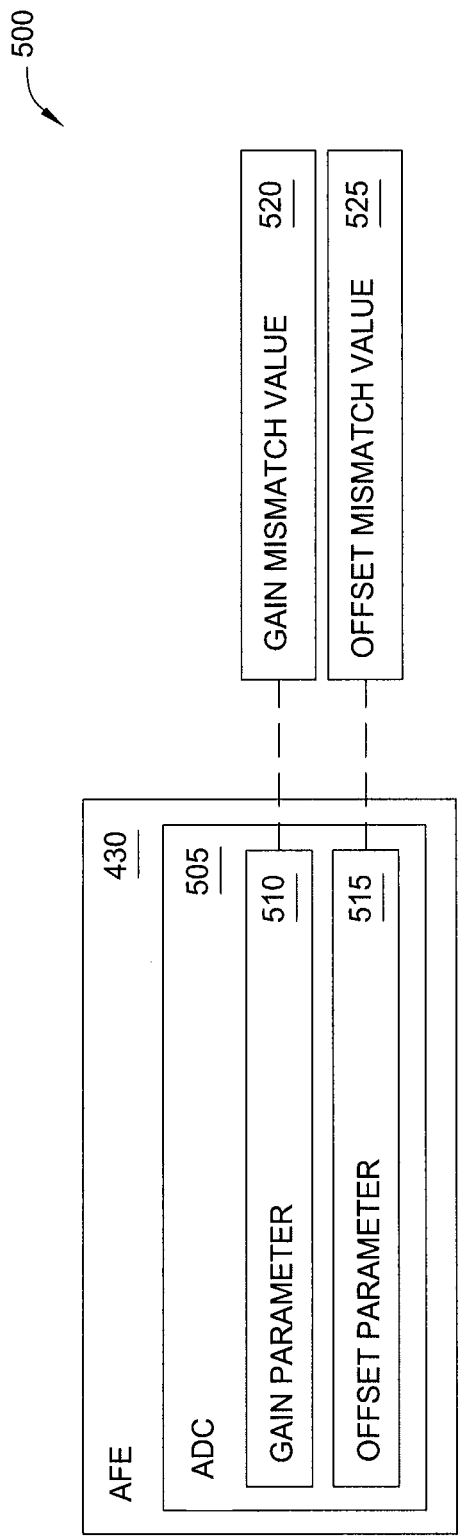
FIG. 5 is a block diagram illustrating a gain mismatch value and an offset mismatch value for an analog front-end, according to embodiments described herein.

As illustrated in the block diagram 500 of FIG. 5, each AFE 430 may include an analog-to-digital converter (ADC) 505 of any suitable type. Some non-limiting examples of ADC 505 include a pipelined ADC, a successive approximation ADC, an integrating ADC, a sigma-delta ADC, and so forth. Each AFE 430 may include other suitable circuitry for acquiring the various measurements, such as filtering circuitry or other signal conditioning circuitry. In some embodiments, each AFE 430 includes a CBC capacitor that is used to mitigate a background capacitance of the sensor electrodes.

Each AFE 430 typically includes an amplifier having a gain parameter 510 and an offset parameter 515. However, the gain parameter 510 and/or the offset parameter 515 can differ for each of the AFEs 430, which can affect the baseline capacitive measurements 445 and the capacitive measurements 450 acquired by the different AFEs 430. First, different parameters can cause inaccuracies to occur in the baseline capacitive measurements 445. For example, a 2 picofarad (pF) baseline capacitance may be measured by a first AFE 430 as 2.05 pF (i.e., with an inaccuracy of 0.05 pF or 50 femtofarads (fF)). Second, the different gain parameter 510 and/or offset parameter 515 can cause non-uniformity to occur in the baseline capacitive measurements 445 and in the capacitance measurements 450 acquired by different AFEs 430. For example, a 2 pF baseline capacitance measured using a first AFE 430 may be measured as 2.05 pF, while the same 2 pF baseline capacitance on a second AFE 430 may be measured as 1.95 pF. If the first AFE 430 and the second AFE 430 each measured 2.05 pF, the baseline capacitive measurements 445 would be uniform even though including some inaccuracy. In another example, capacitance measurements 450 of a 100 fF touch signal capacitance may be measured as 105 fF on the first AFE 430 and as 95 fF on the second AFE 430. Again, if the capacitance measurements 450 by the first AFE 430 and the second AFE 430 were each 95 fF, the capacitance measurements 450 would be uniform even though including some inaccuracy.

In some embodiments, to mitigate the effects of differing parameters and to better standardize baseline capacitive measurements 445 and/or capacitive measurements 450 for different AFEs 430, the sensor module 310 may perform one or more predefined operations for determining gain mismatch values 520 and/or offset mismatch values 525 for the plurality of AFEs 430. The gain mismatch values 520 reflect differences in the gain parameters 510 for the different AFEs 430, and the offset mismatch values 525 for the plurality of AFEs 430. An exemplary method for determining offset mismatch values 525 is described below with respect to FIG.

8, and an exemplary method for determining gain mismatch values 520 is described below with respect to FIG. 7. Further, although exemplary processes for determining gain mismatch values 520 and offset mismatch values 525 are described separately, implementations of the processing system 110 may be configured to apply both gain mismatch values 520 and offset mismatch values 525 to baseline capacitive measurements 445 and/or capacitive measurements 450 to mitigate gain mismatch and offset mismatch of the different AFEs 430.

In some embodiments, the sensor module 310 may use one or more calibration capacitors 435 for acquiring gain mismatch values 520. The one or more calibration capacitors 435 may have well-controlled capacitance values. In some embodiments, the one or more calibration capacitors 435 may be a plurality of calibration capacitors 435, each of which has a distinct capacitance value. In other embodiments, the one or more calibration capacitors 435 may be a single variable capacitor having a plurality of predefined capacitance values. The one or more calibration capacitors 435 may have any suitable implementation, such as a single variable capacitor, a selectable capacitor bank, and so forth.

In some embodiments, the one or more calibration capacitors 435 are common to (or shared by) the different AFEs 430. However, in other embodiments, the one or more calibration capacitors 435 may be specific to each of the different AFEs 430. For example, the one or more calibration capacitors 435 may comprise the CBC capacitors of the AFE 430. Although the implementation of CBC capacitors may differ for different AFEs 430, this may still yield acceptable results for cases where the mismatch of the CBC capacitors is significantly less than the gain mismatch values of the AFEs 430.

When acquiring the gain mismatch values 520, each AFE 430 may be individually coupled with the one or more calibration capacitors 435 according to a predefined sequence. In some embodiments, the sensor module 310 further comprises a multiplexer (not shown) configured to couple a selected AFE 430 to the one or more calibration capacitors 435.

In some embodiments, the sensor module 310 includes a dedicated calibration transmitter 440 that is configured to drive the one or more calibration capacitors 435 with a predefined calibration signal to acquire the gain mismatch values 520. The calibration signal may be a periodic waveform such as a sinusoidal waveform, a square waveform, or any other suitable periodic waveform. In other embodiments, one or more other transmitters of the transmitter circuitry 405 (such as the sensor electrode transmitters 410 and/or the CBC transmitters 420) are used to drive the one or more calibration capacitors 435.

Figure 6:
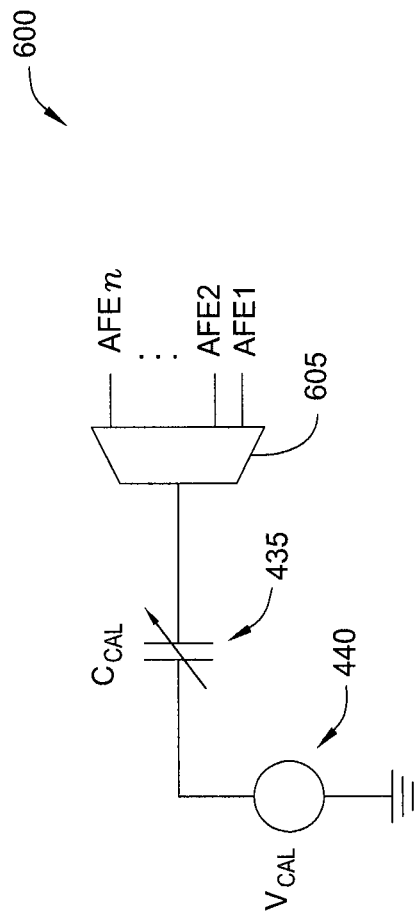
FIG. 6 is a circuit diagram illustrating acquiring measurements using a calibration capacitor, according to embodiments described herein.

FIG. 6 is a circuit diagram 600 illustrating acquiring measurements using a calibration capacitor, according to embodiments described herein. The circuitry included in the circuit diagram 600 may be used in conjunction with other embodiments, such as implemented within the processing system 110 illustrated in FIGS. 1, 3, and 4, and discussed above.

In the circuit diagram 600, the calibration transmitter 440 provides an input voltage signal $V_{CAL}$ to the calibration capacitor 435. As shown, the calibration capacitor 435 comprises a variable capacitor having a plurality of predefined capacitance values that may be selected. The calibration capacitor 435 is coupled via a multiplexer 605 with a selected AFE of the plurality of AFEs (AFE1, AFE2, ..., AFEn). Thus, the calibration capacitor 435 and the multiplexer 605 may be controlled to acquire a plurality of measurements using each AFE, where each of the plurality of measurements corresponds to a different capacitance value of the calibration capacitor 435.

Figure 7:
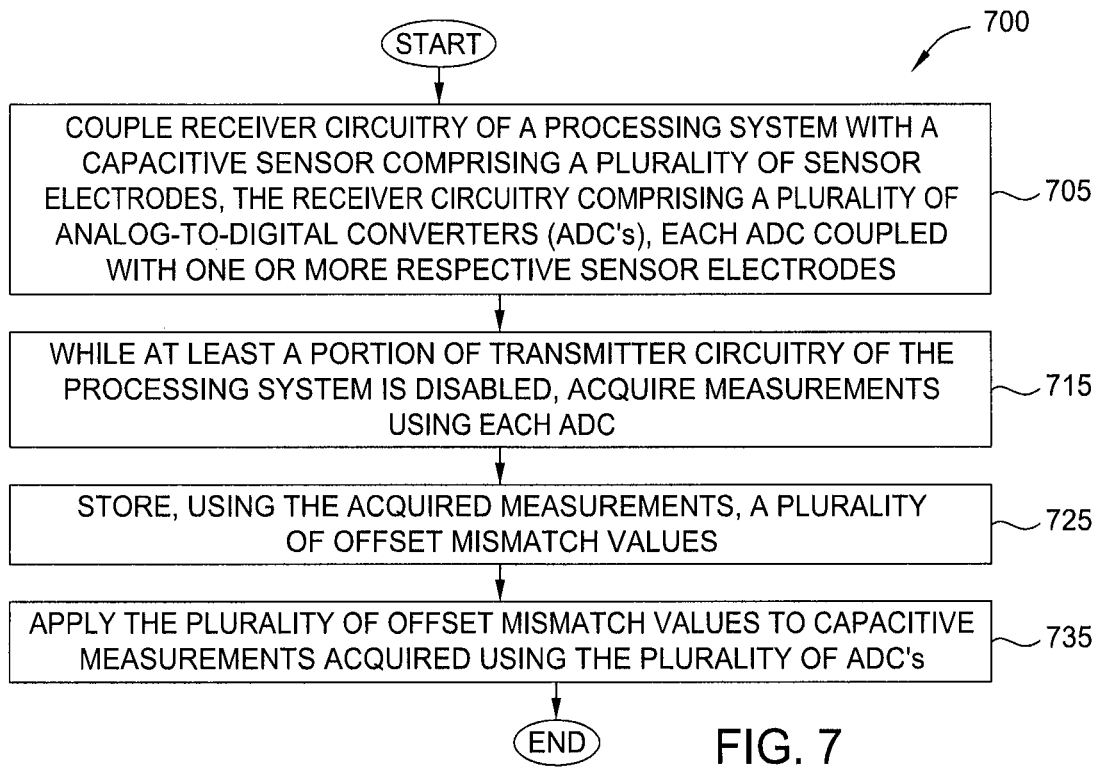
FIG. 7 is a method of determining a plurality of offset mismatch values, according to embodiments described herein.

FIG. 7 is a method 700 of determining a plurality of offset mismatch values, according to embodiments described herein. The method 700 may be used in conjunction with other embodiments, such as performed using the processing system 110 illustrated in FIGS. 1, 3, and 4 and discussed above. Method 700 begins at block 705, where receiver circuitry of the processing system is coupled with a capacitive sensor comprising a plurality of sensor electrodes. The receiver circuitry comprises a plurality of ADCs, each ADC coupled with one or more respective sensor electrodes.

At block 715, the processing system acquires measurements using each ADC while at least a portion of transmitter circuitry of the processing system is disabled. In some embodiments, all of the transmitter circuitry is disabled. In an ideal case, each ADC would have a zero measurement as no sensing signals are being transmitted using the transmitter circuitry. However, the ADCs will acquire non-zero measurements due to the offset parameters of the ADCs. The offset parameters should be constant for a given ADC, independent of which sensor electrodes are coupled with the ADC. In some alternate embodiments, the offset parameters may be measured while the ADCs are disconnected from the capacitive sensor.

At block 725, the processing system stores a plurality of offset mismatch values using the acquired measurements. In some embodiments, the plurality of offset mismatch values includes a respective offset mismatch value for each ADC. At block 735, the processing system applies the plurality of offset mismatch values to capacitive measurements acquired using the plurality of ADC. Method 700 ends following completion of block 735.

Figure 8:
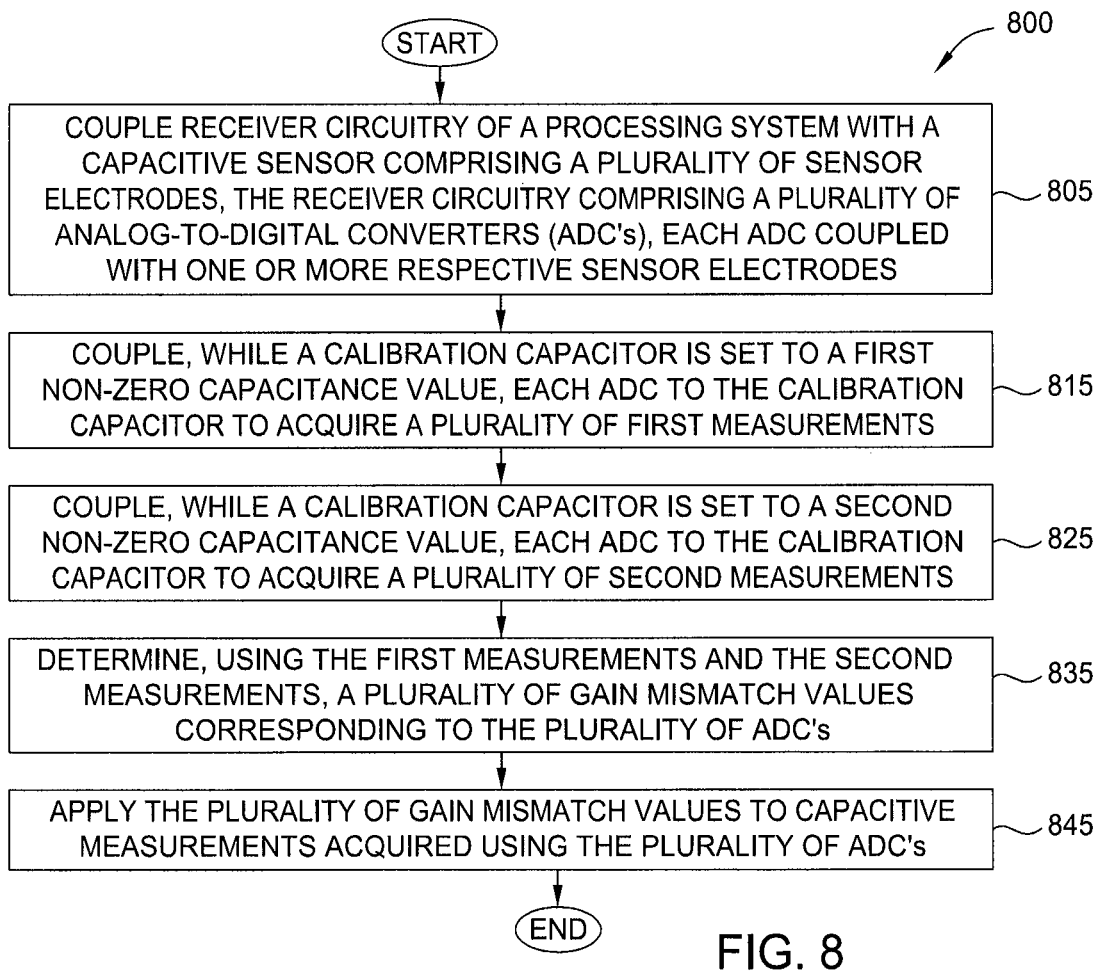
FIG. 8 is a method of determining a plurality of gain mismatch values, according to embodiments described herein.

FIG. 8 is a method 800 of determining a plurality of gain mismatch values, according to embodiments described herein. The method 800 may be used in conjunction with other embodiments, such as performed using the processing system 110 illustrated in FIGS. 1, 3, and 4 and discussed above. Method 800 begins at block 805, where receiver circuitry of the processing system is coupled with a capacitive sensor comprising a plurality of sensor electrodes. The receiver circuitry comprises a plurality of ADCs, each ADC coupled with one or more respective sensor electrodes.

At block 815, while a calibration capacitor is set to a first non-zero capacitance value, the processing system couples each ADC to the calibration capacitor to acquire a plurality of first measurements. Each ADC may be coupled with the calibration capacitor through a multiplexer, and each ADC may be selected according to a predefined sequence. At block 825, while a calibration capacitor is set to a second non-zero capacitance value, the processing system couples each ADC to the calibration capacitor to acquire a plurality of second measurements.

In some embodiments, the processing system operates transmitter circuitry in a predetermined state while acquiring the first measurements and the second measurements. The predetermined state may be selected based on a dynamic range of the receiver circuitry. For example, the dynamic range of the receiver circuitry may be insufficient to support an implementation in which driving one or more sensor electrodes using the transmitter circuitry causes clipping to occur in the receiver circuitry. This may be the case for some absolute capacitive implementations of the capacitive sensor. In such a case, the predetermined state comprises enabling transmitters of the transmitter circuitry, which may include a guard amplifier.

In another example, the dynamic range of the receiver circuitry is sufficient to support an implementation in which driving one or more sensor electrodes using the transmitter circuitry does not cause clipping to occur in the receiver circuitry. This may be the case for some transcapacitive implementations of the capacitive sensor. In such a case, the predetermined state comprises disabling transmitters of the transmitter circuitry.

In some embodiments, acquiring the first measurements and/or the second measurements comprises enabling a calibration transmitter. In some embodiments, the calibration transmitter comprises a guard amplifier for performing absolute capacitive sensing. In some embodiments, the calibration transmitter comprises a CMOS driver for performing transcapacitive sensing.

At block 835, the processing system determines, using the first measurements and the second measurements, a plurality of gain mismatch values corresponding to the plurality of ADCs. At block 845, the processing system applies the plurality of gain mismatch values to capacitive measurements acquired using the plurality of ADCs. Method 800 ends following completion of block 845.

FIG. 9 is a chart 900 illustrating exemplary compensation for gain mismatch values, according to embodiments described herein. The compensation may be used in conjunction with other embodiments, such as performed within the method 800 discussed above.

The chart 900 illustrates actual values 920 of a calibration capacitor, as well as values 925(1), 925(2), . . . , 925(n) corresponding to measurements acquired by AFE1, AFE2, AFEn. For a first calibration capacitor value $C_{CAL}(1)$ having an actual value 920 of 1.00 pF, the first measurements 905(1) acquired by AFE1 is 1.02 pF, by AFE2 is 0.95 pF, and by AFEn value is 1.05 pF. For a second calibration capacitor value $C_{CAL}(2)$ having an actual value 920 of 2.00 pF, the second measurements 905(2) acquired by AFE1 is 2.05 pF, by AFE2 is 1.91 pF, and by AFEn is 2.09 pF.

In some embodiments, a plurality of difference values 910 is determined between the first measurements 905(1) and the second measurements 905(2). Each difference value 910 corresponds to a respective AFE of the plurality of AFEs. In chart 900, the difference value 910 for AFE1 is 2.05 pF−1.02 pF=1.03 pF, the difference value 910 for AFE2 is 1.91 pF−0.95 pF=0.96 pF, and the difference value 910 for AFEn is 2.09 pF−1.05 pF=1.04 pF.

In some embodiments, an average difference value 930 is determined as an arithmetic mean of the plurality of difference values 910. As shown, the average difference value 930 is 1.02 pF. In some embodiments, a plurality of normalized difference values 915 is determined by dividing each of the plurality of difference values 910 by the average difference value 930. As shown, the normalized difference value 915 for AFE1 is 1.01, for AFE2 is 0.94, and for AFEn is 1.02.

In some embodiments, applying the plurality of gain mismatch values comprises scaling the baseline capacitive measurements and/or capacitive measurements by the normalized difference values 915. For example, capacitive measurements acquired by AFE1 may be multiplied by (1/1.01), capacitive measurements acquired by AFE2 may be multiplied by (1/0.94), and capacitive measurements acquired by AFEn may be multiplied by (1/1.02). Scaling the baseline capacitive measurements and/or capacitive measurements thus mitigates the gain mismatch between the different AFEs.

In some embodiments, the offset mismatch values are applied to the baseline capacitive measurements and/or capacitive measurements prior to applying the gain mismatch values. For example, assume that the offset mismatch values for AFE1 is −0.01 fF, for AFE2 is −0.01 fF, and for AFEn is +0.01 fF. When measuring the absolute value of the capacitance of the coupled sensor electrodes, the offset mismatch values may be subtracted from each measurement before applying the gain mismatch values. In some cases, when measuring a delta (i.e., a change in capacitance) from a baseline capacitive measurement, the offset mismatch values are removed when the baseline capacitive measurement is subtracted from the capacitive measurement. The gain mismatch values are applied after subtracting the baseline capacitive measurement from the capacitive measurement.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A method comprising:
   coupling receiver circuitry of a processing system with a capacitive sensor comprising a plurality of sensor electrodes, the receiver circuitry comprising a plurality of analog-to-digital converters (ADCs), each ADC of the plurality of ADCs coupled with one or more respective sensor electrodes of the plurality of sensor electrodes;
   while sensing signals are not provided by transmitter circuitry of the processing system, acquiring measurements using each ADC of the plurality of ADCs; and
   storing, for each ADC of the plurality of ADCs, based on the acquired measurements, an offset mismatch value in a memory of the processing system,
   wherein the processing system is operable to apply the plurality of offset mismatch values to capacitive measurements acquired using the plurality of ADCs.

2. The method of claim 1, wherein each offset mismatch value of the plurality of offset mismatch values corresponds to a respective ADC of the plurality of ADCs.

3. The method of claim 1, wherein the capacitive measurements acquired using the plurality of ADCs comprise baseline capacitive measurements.

4. The method of claim 3, wherein applying the plurality of offset mismatch values to the capacitive measurements comprises:
   for a first ADC of the plurality of ADCs, subtracting a first offset mismatch value corresponding to the first ADC from a first baseline capacitive measurement acquired by the first ADC.

5. The method of claim 1, further comprising:
   disabling at least a portion of the transmitter circuitry, wherein the transmitter circuitry comprises at least one of: a sensor electrode transmitter, a guard amplifier, and a coarse background compensation transmitter.

6. The method of claim 1, further comprising:
   coupling, while a calibration capacitor is set to a first non-zero capacitance value, each ADC of the plurality of ADCs to the calibration capacitor to acquire a plurality of first measurements;
   coupling, while the calibration capacitor is set to a second non-zero capacitance value, each ADC of the plurality of ADCs to the calibration capacitor to acquire a plurality of second measurements; and determining, using the first measurements and the second measurements, a plurality of gain mismatch values corresponding to the plurality of ADCs, wherein the processing system is operable to apply the plurality of gain mismatch values to capacitive measurements acquired using the plurality of ADCs.

7. The method of claim 6, further comprising:
applying the plurality of gain mismatch values to the capacitive measurements after applying the plurality of offset mismatch values to the capacitive measurements.

8. A processing system comprising:
transmitter circuitry configured to drive sensing signals onto a plurality of sensor electrodes; and
receiver circuitry comprising a plurality of analog-to-digital converters (ADCs), each ADC of the plurality of ADCs coupled with one or more respective sensor electrodes of the plurality of sensor electrodes, wherein the receiver circuitry is configured to:
  while the sensing signals are not provided by the transmitter circuitry, acquire measurements using each ADC of the plurality of ADCs;
  store, for each ADC of the plurality of ADCs, based on the acquired measurements, an offset mismatch value in a memory; and
  apply the plurality of offset mismatch values to capacitive measurements acquired using the plurality of ADCs.

9. The processing system of claim 8, wherein each offset mismatch value of the plurality of offset mismatch values corresponds to a respective ADC of the plurality of ADCs.

10. The processing system of claim 8, wherein the capacitive measurements acquired using the plurality of ADCs comprise baseline capacitive measurements.

11. The processing system of claim 10, wherein applying the plurality of offset mismatch values to the capacitive measurements comprises:
  for a first ADC of the plurality of ADCs, subtracting a first offset mismatch value corresponding to the first ADC from a first baseline capacitive measurement acquired by the first ADC.

12. The processing system of claim 8, wherein the transmitter circuitry comprises at least one of: a sensor electrode transmitter, a guard amplifier, and a coarse background compensation transmitter.

13. The processing system of claim 8, wherein the receiver circuitry is further configured to:
  couple, while a calibration capacitor is set to a first non-zero capacitance value, each ADC of the plurality of ADCs to the calibration capacitor to acquire a plurality of first measurements;
  couple, while the calibration capacitor is set to a second non-zero capacitance value, each ADC of the plurality of ADCs to the calibration capacitor to acquire a plurality of second measurements;
  determine, using the first measurements and the second measurements, a plurality of gain mismatch values corresponding to the plurality of ADCs; and
  apply the plurality of gain mismatch values to the capacitive measurements acquired using the plurality of ADCs.

14. The processing system of claim 13, wherein applying the plurality of gain mismatch values to the capacitive measurements is performed after applying the plurality of offset mismatch values to the capacitive measurements.

15. A method comprising:
coupling receiver circuitry of a processing system with a capacitive sensor comprising a plurality of sensor electrodes, the receiver circuitry comprising a plurality of analog-to-digital converters (ADCs), each ADC of the plurality of ADCs coupled with one or more respective sensor electrodes of the plurality of sensor electrodes;
for each ADC of the plurality of ADCs:
  coupling, while a respective calibration capacitor of the ADC is set to a first non-zero capacitance value, the ADC to the calibration capacitor to acquire a first measurement;
  coupling, while a respective calibration capacitor of the ADC is set to a second non-zero capacitance value, the ADC to the calibration capacitor to acquire a second measurement; and
  determining, using the first measurement and the second measurement, a gain mismatch value respectively corresponding to the ADC,
wherein the processing system is operable to apply the gain mismatch value to capacitive measurements acquired using the ADC.

16. The method of claim 15, further comprising:
while acquiring the first measurements and the second measurements, operating transmitter circuitry of the processing system in a predetermined state, wherein the predetermined state is selected based on a dynamic range of the receiver circuitry.

17. The method of claim 16, wherein the dynamic range of the receiver circuitry is insufficient to support an implementation in which driving one or more sensor electrodes using the transmitter circuitry causes clipping to occur in the receiver circuitry,
  wherein the predetermined state comprises enabling transmitters of the transmitter circuitry.

18. The method of claim 16, wherein the dynamic range of the receiver circuitry is sufficient to support an implementation in which driving one or more sensor electrodes using the transmitter circuitry does not cause clipping to occur in the receiver circuitry,
  wherein the predetermined state comprises disabling transmitters of the transmitter circuitry.

19. The method of claim 15, wherein determining the plurality of gain mismatch values corresponding to the plurality of ADCs comprises:
  for each ADC of the plurality of ADCs, determining a respective difference value between a corresponding first measurement and a corresponding second measurement, wherein a plurality of difference values are determined; and
  determining an average difference value using the plurality of difference values, wherein the plurality of gain mismatch values are determined using the average difference value and the plurality of difference values.

20. The method of claim 19, wherein determining the plurality of gain mismatch values comprises:
  determining a plurality of normalized difference values by dividing each of the plurality of difference values by the average difference value, and
wherein applying the plurality of gain mismatch values comprises scaling the capacitive measurements acquired using the plurality of ADCs by the normalized difference values.

* * * * *